US009250873B2

(12) United States Patent
Fischer et al.

(10) Patent No.: US 9,250,873 B2
(45) Date of Patent: Feb. 2, 2016

(54) METHOD FOR THE COMPUTER-AIDED GENERATION OF AT LEAST ONE PART OF AN EXECUTABLE CONTROL PROGRAM

(71) Applicant: dSPACE digital signal processing and control engineering GmbH, Paderborn (DE)

(72) Inventors: Karsten Fischer, Paderborn (DE); Torsten Pietzsch, Paderborn (DE); Michael Mair, Paderborn (DE); Wolfgang Trautmann, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 37 days.

(21) Appl. No.: 14/024,206

(22) Filed: Sep. 11, 2013

(65) Prior Publication Data
US 2014/0075409 A1 Mar. 13, 2014

Related U.S. Application Data

(60) Provisional application No. 61/699,370, filed on Sep. 11, 2012.

(30) Foreign Application Priority Data

Sep. 11, 2012 (EP) .................................... 12183797

(51) Int. Cl.
*G06F 9/45* (2006.01)
*G06F 9/44* (2006.01)
*G05B 19/042* (2006.01)

(52) U.S. Cl.
CPC .............. *G06F 8/41* (2013.01); *G05B 19/0426* (2013.01); *G06F 8/34* (2013.01); *G06F 8/35* (2013.01)

(58) Field of Classification Search
CPC ............................ G06F 8/41; G06F 8/34–8/36
See application file for complete search history.

(56) References Cited

U.S. PATENT DOCUMENTS 5,850,548 A * 12/1998 Williams .................. G06F 8/34
715/961
6,851,104 B1* 2/2005 Rodrigues da Silva ... G06F 8/36
717/104

(Continued)

FOREIGN PATENT DOCUMENTS

EP          1 522 910 A1    4/2005
EP          2 330 469 A1    6/2011
WO        WO 00/73885 A1   12/2000

OTHER PUBLICATIONS

Hans J. Köhler, Ulrich Nickel, Jörg Niere, and Albert Zündorf, Integrating UML diagrams for production control systems, [Online] 2000, In Proceedings of the 22nd international conference on Software engineering (ICSE '00). ACM, New York, NY, USA, <http://doi.acm.org/10.1145/337180.337207> pp. 241-251.*

(Continued)

*Primary Examiner* — Thuy Dao
*Assistant Examiner* — Ravi K Sinha
(74) *Attorney, Agent, or Firm* — Muncy, Geissler, Olds & Lowe, P.C.

(57) ABSTRACT

A method for the computer-aided generation of at least one part of an executable control program, particularly a measuring, control, regulating, and/or calibration program, for controlling a control system having at least one electronic processor unit is provided. The functionality of the control program is described at least partially in at least one graphical model and the graphical model is divided in hierarchical levels into submodels. A submodel can be divided nested into submodels of a lower hierarchical level, whereby values for options for the compiling of the graphical model to program code are preset and program code is generated from the model co-compiled to the executable control program. Values for options for the compiling of the graphical model to program code and to the executable control program can be preset thereby granularly with the automatic avoidance of conflicting presettings of values for these options.

18 Claims, 9 Drawing Sheets

(56) References Cited

U.S. PATENT DOCUMENTS

| | | | |
|---|---|---|---|
| 7,523,023 B1* | 4/2009 | Koh | G06F 8/35 703/2 |
| 7,966,162 B1* | 6/2011 | Raghavan | G06F 8/34 703/13 |
| 8,015,543 B1* | 9/2011 | Carrick | G06F 8/35 717/106 |
| 8,166,452 B2* | 4/2012 | Kinnucan et al. | 717/105 |
| 8,229,579 B2* | 7/2012 | Eldridge et al. | 700/31 |
| 8,365,141 B1* | 1/2013 | Yan | G06F 8/34 717/104 |
| 8,464,204 B1* | 6/2013 | Thornton | G06F 11/3608 717/100 |
| 9,003,360 B1* | 4/2015 | Feng | G06F 8/35 717/105 |
| 2004/0148151 A1 | 7/2004 | Menter et al. | |
| 2006/0248518 A1* | 11/2006 | Kundert | G06F 17/5036 717/140 |
| 2008/0082959 A1* | 4/2008 | Fowler | G06F 8/35 717/104 |
| 2008/0092111 A1* | 4/2008 | Kinnucan et al. | 717/105 |
| 2008/0098351 A1* | 4/2008 | Weatherhead | G06F 8/36 717/107 |
| 2009/0125128 A1* | 5/2009 | Eldridge et al. | 717/104 |
| 2010/0192122 A1 | 7/2010 | Esfahan et al. | |
| 2011/0138353 A1 | 6/2011 | Niere et al. | |
| 2012/0030646 A1* | 2/2012 | Ravindran | G06F 8/34 717/105 |
| 2013/0198713 A1* | 8/2013 | Zhang | G06F 8/35 717/106 |
| 2014/0101636 A1* | 4/2014 | Correll | G06F 8/34 717/113 |

OTHER PUBLICATIONS

Mosterman, P.J.; Sztipanovits, J.; Engell, S., Computer-automated multiparadigm modeling in control systems technology, [Online] 2004, in Control Systems Technology, IEEE Transactions on , vol. 12, No. 2, Mar. 2004, [Retrieved from the Internet] <http://ieeexplore.ieee.org/stamp/stamp.jsp?tp=&arnumber=1281780&isnumber=28628> pp. 223-234.*

Steffen, Bernhard, et al., Model-driven development with the jABC, [Online] 2007, Hardware and Software, Verification and Testing. Springer Berlin Heidelberg, 2007, [Retrieved from the Internet] <http://link.springer.com/chapter/10.1007/978-3-540-70889-6_7#> pp. 92-108.* dSPACE, "Using the dSPACE Data Dictionary in a Multi-User Environment Version 1.0," pp. 1-15 (Jan. 2006).

Pure-systems GmbH, "pure::variants User's Guide Verison 3.0 for pure::variants 3.0," pp. 1-160 (2009).

TargetLink, "Configuring the Code Generator for Production Code Generation," pp. 241-246 (Nov. 2011).

The MathWorks, Inc., "Manage a Configuration Set," pp. 1-2 (2012).

Fischer et al. presentation, "Hierarchische Verbung und Komposition von Optionseinstellungen," pp. 1-11 (Apr. 2012) with English translation.

Müller et al., "Eine Sache der Einstellung," http//www.it-republik.de/dotnet/artikel/0250, pp. 1-6 (Oct. 2002) with English translation.

Dr. Holger Schwichtenberg, "Konfiguration ASP.NET," http://www.it.visions.de/dotnet/aspnet/aspnet_konfigurationallgemein.aspx, pp. 1-10 (2012) with English translation.

* cited by examiner

METHOD FOR THE COMPUTER-AIDED GENERATION OF AT LEAST ONE PART OF AN EXECUTABLE CONTROL PROGRAM

This nonprovisional application claims priority to European Patent Application No. EP 12183797.5, which was filed in Europe on Sep. 11, 2012, and to U.S. Provisional Application No. 61/699,370, which was filed on Sep. 11, 2012, and which are both herein incorporated by reference.

BACKGROUND OF THE INVENTION

1. Field of the Invention

The invention relates to a method for the computer-aided generation of at least one part of an executable control program, particularly a measuring, control, regulating, and/or calibration program, for controlling a control system having at least one electronic processor unit, whereby the functionality of the control program is described at least partially in at least one graphical model and the graphical model is divided in hierarchical levels into submodels, whereby a submodel of a hierarchical level can be divided nested into submodels of a lower hierarchical level, whereby values for options for the compiling of the graphical model to program code are preset and with consideration of the values for the options, program code is generated computer-aided from the model and the program code is co-compiled to the executable control program.

2. Description of the Background Art

Methods for the computer-aided generation have been very common and established for several years in the development of control systems, because they enable secure and convenient automated code generation for mainly real-time-capable control systems (e.g., production code generation with TargetLink). Depending on the degree of complexity of the control systems, one or more, partially or also completely networked control devices, which typically have appropriate I/O interfaces, are often used as processor units to be able to measure metrologically state variables of a physical-technical system to be influenced, and to be able to influence the physical-technical system by outputting specific control variables.

The advantage of such methods is that the desired functionality of the control program can be modeled on an abstract level by means of a graphical model, for example, in the form of block diagrams, which allow the depiction of highly complicated mathematical and structural relationships in a very simple way. Even I/O functionalities can be depicted and modeled in such a graphical model. It is then basically possible by using the method in question to generate program code for the very specialized hardware of the electronic processor unit, which is compiled, therefore translated, to an executable control program and can be executed and tested on this specialized target hardware. The error-prone manual conversion of a control concept into program code and thus ultimately into the control program is obviated; as a result, the rapid development cycles typical today have now become possible, for example, within the scope of rapid control prototyping or hardware-in-the-loop simulation.

Graphical models, particularly in the form of block diagram, are especially suitable for dividing a functionality into different model parts. Model parts within or at a hierarchical level are complementary at this hierarchical level to form an overall graphical model, whereby these model parts, solely on the basis of the complexity of many graphical models, are handled by different developers or development teams. In the case of a vehicle, the model parts can be, for example, the models of a drive assembly, drive train, and vehicle structure, whereby each of these model parts can break down into further model parts, i.e., submodels.

Typically, a graphical model can be divided into model parts not only within or at a hierarchical level, therefore "horizontally" into complementary model parts. Rather, the graphical model of a hierarchical level or the submodels in this hierarchical level can each be divided into submodels or nested into submodels of a different hierarchical level, whereby the submodels in a lower hierarchical level depict the functionality of the overlying submodel of the next higher hierarchical level often only in a different level of detail. Nested submodels of a graphical model at different hierarchical levels are accordingly expanded "vertically" and show one and the same functionality in different detail. Submodels at different hierarchical levels are also suitable for being handled simultaneously collaboratively by different developers.

It can be easily understood that there are dependencies between the different parts or nested submodels of a graphical model; these relate to the generation of program code from parts or submodels of the graphical model and should be considered in the further compiling of program code to the executable control program.

EP 1 522 910 A1, which is incorporated herein by reference, for example, discloses a method for generating an executable control program, in which it is possible in a simple way to configure the configuration of mathematically abstract parts of the graphical model independent of hardware-dependent settings of the target hardware.

EP 2 330 469 A1, which corresponds to US 20110138353, and which is incorporated herein by reference, discloses another method for generating an executable control program for controlling a control system, in which conflict-free generation of program code is achieved by suitable referencing between data elements in a data element set and parts of the graphical model.

The invention presented below is based on the realization that the rendering of the graphical model into program code based on dependencies between submodels can be problematic, particularly when values for options for compiling the graphical model to program code are preset, which influence the compiling of program code to the executable control program, and these preset values are different, for example, in nested submodels. In this situation, the questions arise how to resolve possibly ambiguous option presets, which concern, for example, compiler instructions, how to avoid logically contradictory presets, and how to resolve possible cases of conflict.

SUMMARY OF THE INVENTION

It is therefore an object of the present invention to provide a method for the computer-aided generation of at least one part of an executable control program, in which values for options for compiling the graphical model to program code and to the executable control program can be preset granularly with automatic avoidance of conflicting presets of values for these options.

The method of the invention, in which the previously derived and shown object is attained in an embodiment, is first and substantially characterized in that values for options for compiling the graphical model for at least two nested submodels of different hierarchical levels are preset, and the values for the options are taken into account in the computer-aided generation of program code for each submodel, whereby an option of the submodel, said option not provided with a value, at the lower hierarchical level assumes the value of the corresponding option of the submodel at the higher hierarchical level.

The method of the invention according to an embodiment is therefore notable in that the possibility is provided in general to preset options for compiling the graphical model for at least two nested submodels of different hierarchical levels, whereby it is provided further according to the invention that a value that is not preset for an option for program code generation and compiling in the submodel of a lower hierarchical level is assumed by a corresponding value preset for this option from the submodel of a higher hierarchical level. It is achieved in this way that the same options or the same values for options for compiling the graphical model are used for submodels at lower hierarchical levels, as in submodels at higher hierarchical levels; as a result, uniform handling is assured, at all events in the case that corresponding values for options for submodels of a lower hierarchical levels are not (locally) set. Examples of such options are optimization instructions for the compiler (translator)—optimization of the code for a fast runtime or for a small memory requirement—, the presetting of the value for the bit width of the control system, presets with respect to the memory layout, presets for security-critical options (optimizations allowable or not allowable), etc.

It is provided according to an embodiment of the computer-aided method for generating at least one part of an executable control program that a preset value for an option at the lower hierarchical level has precedence over a preset value for the corresponding option at the higher hierarchical level, whereby hierarchical levels of nested submodels are again meant here. In the case that a value for an option is set at the lower hierarchical level, it overlays the option set at the higher hierarchical level, so that such a locally set value has precedence over the value, set at the higher-order hierarchical level, for the same option. This behavior makes it possible, for example, to set optimization options in nested submodels differently, as a result of which a desired granularity in the presetting of values for option can be established.

It is provided in another embodiment of the method that for a preset value for an option for a submodel at a hierarchical level the number of the lower hierarchical levels can be specified and is specified in which the preset value for the respective option has precedence. The range of a value presetting for an option can be set practically by this measure. It is provided in particular that according to this selected number of lower hierarchical levels, the value for the respective option again assumes the value that has been set for this option in the higher hierarchical level. If the value of zero is selected as the number of the lower hierarchical levels for a preset, then this means that the value for the respective option is valid only at this one hierarchical level in which the value has been set. According to the preferred behavior, then even the value in the next lower hierarchical level of the nested submodel again has the value for the respective option, which has been set in the higher hierarchical level of the nested submodel. There is again the possibility of the local presetting of a value for the respective option in the next lower hierarchical level as well.

According to another embodiment, the method of the invention provides that a preset value for an option for a submodel at a hierarchical level and/or for an option for the model at the highest hierarchical level is designated as unchangeable, therefore as a constant option, so that the value for this option at a lower hierarchical level is no longer changed, particularly also when another value is established for the corresponding option at a lower hierarchical level. This is appropriate, for example, for such options which must be set as uniform across all hierarchical levels. If the control system has, for example, only a single electronic processor unit with a single known bit width, the novel embodiment enables, for example, the presetting of the bit width of the code to be generated uniformly for all submodels at all hierarchical levels.

According to another embodiment of the method, a default option for the compiling of the graphical model to program code is defined and a default value is preset, which is used particularly as a preset value for the corresponding option of the model at the highest hierarchical level, if the value of the corresponding option is not defined in the graphical model. This measure can prevent all necessary options from not being considered, and it can also be avoided that values that are not set for this option remain unset, which possibly would prevent successful generation of the program code later or, however, successful compiling of the program code to the control program.

On the other hand, to force the presetting of a value for an option by the user of the method, it is provided in an embodiment of the method that at least one option for a submodel at a hierarchical level and/or at least one option for the model at the highest hierarchical level and/or at least one default option are labeled as an option to be provided with a value at a lower hierarchical level. It is provided in particular that an error message or warning is output, when the associated option was not assigned a value at a lower hierarchical level at the time of the compiling of the graphical model to program code. In the case of an error message, the compiling process terminates. When a warning is output, the compiling of the graphical model is not interrupted, but the user is made aware of the omitted presetting of a value for the identified option.

In a further embodiment, at least one option for a submodel at a hierarchical level and/or at least one option for the model at the highest hierarchical level and/or at least one default option are labeled as a consistency option, which means that at the latest at the time of the compiling of the graphical model to program code it is verified whether the values for the consistency option are set consistently in all hierarchical levels, whereby particularly if an inconsistency is detected at least one message, preferably an error or warning message, is output. It can be assured by the possibility of labeling an option as a consistency option and the subsequent verification of consistent values for the consistency option that necessary consistency conditions are met. An example for a consistency option is the bit width of the target system, which must be set as consistent at least per processor unit for all submodels as well (assigned to and therefore run later on this processor unit)—in the present case this means uniform in value.

According to an embodiment, if an inconsistency is detected, the compiling of the graphical model to program code is terminated or the inconsistency-containing model or submodel is compiled to invalidated program code. In the latter case, the compiling of the graphical model to program code is in fact not interrupted, but a reference to the detected inconsistency is generated in the program code at an appropriate place, which prevents compiling of the program code to the executable control program. At the same time, the present invalidated program code makes it possible for the user of the method to inspect the program code, which is advantageous for development purposes.

In a further embodiment, if a consistency option assigned inconsistent values is detected, the value, preset at the highest hierarchical level, for the consistency option is also automatically preset as the preset value for the nested submodel of a lower hierarchical level as well. The consistent assignment of the consistency option is compelled by this strategy, so that in each case a valid program code results.

An embodiment of the method of the invention provides option documentation as a whole. Here, the name and the value of at least one option are documented in addition with information on the source and/or also derivation of the resulting value of this option overall, i.e., globally, and/or also per hierarchical level, which after code generation increases the traceability, for which reason certain options have been associated with certain values. In particular, the source information is generated in the corresponding part of the program code, whereby it is preferably specified as source information whether the option and/or the value of the option have been preset locally in the respective submodel, or whether the option and/or the value of the option in the respective submodel have been assumed from a submodel of a higher hierarchical level, or whether the option and/or the value of the option in the respective submodel have been defined, e.g., by a default preset. The documentation of the source information can be realized very differently. The options information and with it the source information are documented and stored, for example, in at least one part and/or at least one file of the generated program code as comments and/or as a code constant and/or as a preprocessor macro and/or separately in at least one other data memory, particularly a file or a database.

It is provided according to an embodiment of the options information that the options information, and with it the source information, is generated separately from the compiling of the graphical model; in particular the generated documented options information is checked for errors, and preferably the consistency option or the preset values for the consistency option are checked for mutual compatibility. When the options information is generated separately from the compiling of the graphical model, this means that also only the options information can be documented, and a compiling of the graphical model to program code also need not occur. This has the advantage that particularly during a subsequent inspection of the documented options information it can be determined very quickly whether perhaps the compiling of the graphical model to program code or the compiling of the program code to the executable control program fails or will fail because of unsuitable options or unsuitably set values for options. It must be taken into account here that the compiling of complex graphical models to program code, depending on the size of the underlying graphical model, can definitely require several hours, so that a possible failure of the compiling process can be discovered early on in the preliminary stages by means of the plausibility test proposed according to the invention based on the examination of the documented options information.

According to an embodiment, it is provided that the options information, and with it the source information, is generated in the program code itself, whereby the options information is evaluated by suitable compiler instructions during the compiling of the program code to the executable control program by the compiler, particularly with respect to the consistency of preset values in the case of consistency options.

It is shown by way of example below how a check of the options information can be performed by the compiler, here a C compiler. In the example, the graphical model "higher" contains the submodels "lower1" and "lower2." An option "BitWidth" is provided, which describes the bit width of the target processor, therefore of the control system. For the submodel "lower1" the header file "lower1.h" is generated, which contains the options information within the scope of a # define statement. With this it has also been documented which option (bit width) has been set to which value (32), the source information is also stored similarly, namely by prefixing the term "LOWER1." The process is the same for the submodel "lower2," which leads to the generation of the file "lower2.h." Evidently, different values for the option "BitWidth" have been set for both submodels. The generation of the header file "higher.h" as effected by the overall model "higher" contains the compiler instructions, which can be evaluated by the compiler, in that the documented values of the option "BitWidth" are checked for equality and in that an error message is output in the case of inequality.

```
Lower1.h
----------
#define LOWER1_BITWIDTH 32
lower2.h
----------
#define LOWER2_BITWIDTH 16
higher.h
----------
#include lower1.h
#include lower2.h
#define HIGHER _BITWIDTH 16
#if not HIGHER_BITWIDTH == LOWER1_BITWIDTH == LOWER2_BITWIDTH
#error "code for different bit width cannot be mixed"
#endif
```

In the example, program code has been generated for the graphical model at the hierarchically highest level. The code contains instructions with which the options for hierarchically lower submodels can be checked for compatibility and consistency at the time when the program code is compiled to the executable control program.

The options and the preset values for the options and optionally their classification (their labeling as constant, default, and/or consistency option) can be stored at different locations. According to a first advantageous variant, at least one option, its value, and optionally its classification together with the graphical model are stored in at least one model file, so that the information relevant for code generation and compiling are linked to the graphical model itself; in this case, the options are linked directly to their source location. In an alternative embodiment, at least one option, its value, and optionally its classification are stored in a separate database or file and associated there with the particular submodel, so that based on this reference there is an assignment to the source location in the graphical model.

The previously derived object is also attained by a computer-aided development environment in and with which the previously described method is implemented. The development environment is used therefore in the computer-aided generation of at least one part of an executable control program, particularly a measuring, control, regulating, and/or calibration program, for controlling a control system having at least one electronic processor unit, whereby the functionality of the control program is described at least partially in at least one graphical model. The graphical model is divided into submodels, whereby moreover a submodel of a hierarchical level can be divided nested into submodels of a lower hierarchical level. The development environment itself need not be absolutely suitable for processing a graphical model, but at any rate it must be able to take up information on a graphical model. The development environment makes it possible that values for options for the compiling of the graphical model to program code can be preset. The development environment then generates program code with consideration of the values of the options from the graphical model, whereby the program code is then co-compiled from the development environment to the executable control program. The control program itself is then executable in the control system. Values for options for the compiling of the graphical model for at least two nested submodels of different hierarchical levels can be preset by the development environment of the invention, whereby the values for the options are taken into account during the generation of program code for each submodel by the development environment. The development environment detects an option, not provided with a value, of the submodel at the low hierarchical level and automatically presets the value of the corresponding option of the submodel at the higher hierarchical level for this option, as a result of which a supplementation of value presets that have not been made is automatically realized for options. The development environment is accordingly configured so that also the other previously described process steps of the development environment can be performed automatically, whereby the development environment enables the execution of optionally necessary user inputs.

In particular, there is now a plurality of possibilities for developing and refining the method of the invention for generating at least one part of an executable control program. To this end, reference is made, on the one hand, to the claims subordinate to claim 1 and, on the other, to the following description of exemplary embodiments in conjunction with the drawing. In the drawing, Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
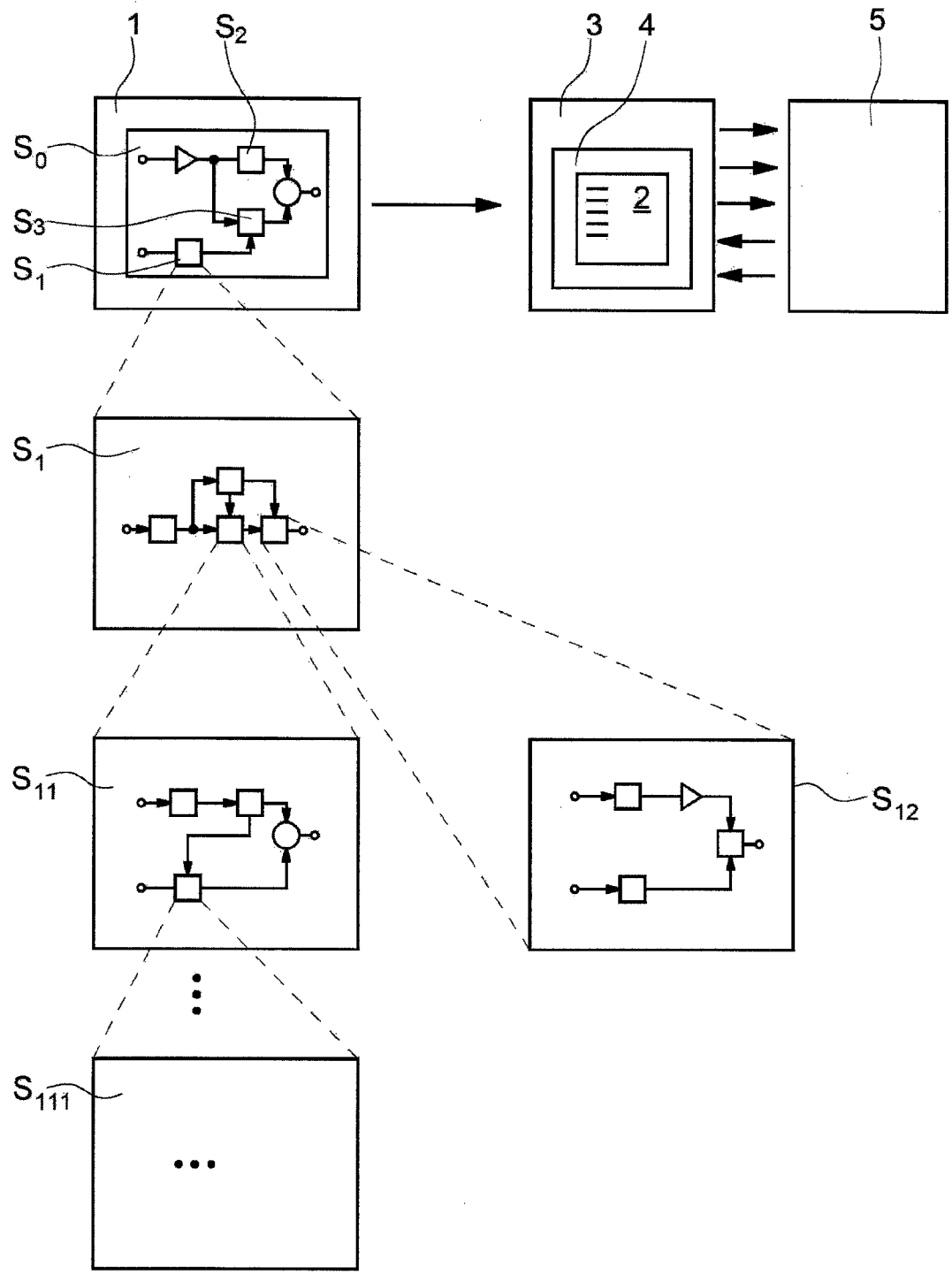
FIG. 1 shows schematically the components for carrying out the method for generating at least one part of a control program and its interrelationships.

Components that are necessary for understanding the method of the invention are illustrated in FIG. 1. The method of the invention is carried out computer-aided by development environment 1, whereby the result of the method is at least one part of an executable control program 2, which is used to control a control system 3 having at least one electronic processor unit 4. Control system 3 in the present case is a control device with I/O interfaces by means of which control system 3 interacts with a physical process 5, whereby control system 3 acts on process 5 by outputting control signals and by technical measurement of state variables of process 5 obtains information about process 5, so that in the present case process 5 can be influenced in a targeted manner.

The functionality of control program 2 is described at least partially in at least one graphical model $S_0$. The illustrated exemplary embodiment in graphical model $S_0$ is a block diagram in the conventional representation of signal flow. The transfer elements shown as blocks/triangles/circles perform mathematical operations on the signals. Graphical model $S_0$ is divided into submodels $S_1$, $S_2$, $S_3$, which are designated generically also as submodels $S_i$. Submodel $S_1$ in the present example is at the highest hierarchical level and is nested in submodels $S_{11}$, $S_{12}$ of a lower hierarchical level. Such a subdivision of the submodels of a lower hierarchical level can be continued recursively with submodels of still lower hierarchical levels, as is indicated for submodel $S_{11}$ by submodel $S_{111}$ in FIG. 1. With this understanding of a submodel, graphical model $S_0$ is also a submodel, namely the submodel at the highest hierarchical level.

Submodels $S_2$, $S_3$ are at the same hierarchical level as submodel $S_1$, whereby its further hierarchical division is not explicitly illustrated in FIG. 1. The overall graphical model $S_0$ is at the highest hierarchical level. Graphical model $S_0$ is compiled to program code, which is not shown in detail here. The program code in turn is then compiled to executable control program 2. In the present case, C program code is generated from graphical model $S_0$ and it is compiled by a C compiler to control program 2.

Before the compiling process, values x for options X for the compiling of graphical model $S_0$ to program code are preset. In the illustrated exemplary embodiments, options X are designated by one or more capital letters A, B, C, D, E, F, and values x for the options X accordingly are designated with one or more lower case letters a, b, c, d, e, f. With consideration of the values a, b, c, d, e, f of options A, B, C, D, E, F, program code is generated computer-aided from model $S_0$, and the program code is co-compiled to executable control program 2. When the program code is "co-compiled" to the executable control program, then this takes into account that control program 2 need not emerge exclusively from program code based on graphical model $S_0$; rather other information can also be utilized to describe the functionality of the control program, for example, in the form of another provided program code, which can also be inserted in the control program.

Figure 2:
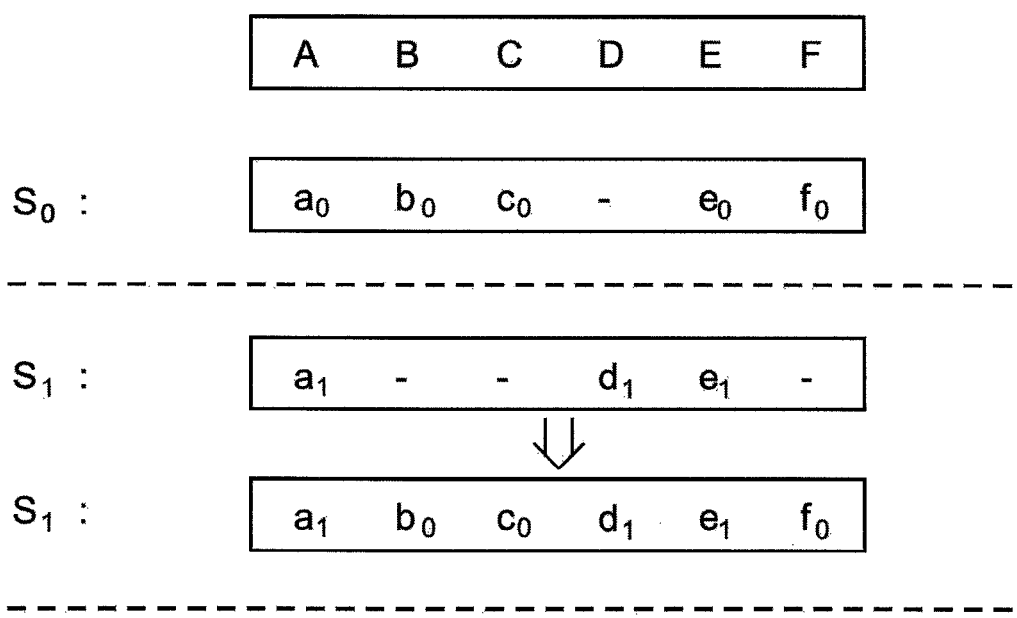
FIG. 2 shows a first aspect of the method of the invention for generating an executable control program.

FIG. 2 shows the operation of the method of the invention for the computer-aided generation of at least one part of the executable control program 2. According to the method, it is made possible to preset values $x_j$ (designated with $a_0$, $b_0$, ..., $a_1$, $b_1$, ..., etc., below) for options A, B, ..., etc., for the compiling of graphical model $S_0$ for at least two nested submodels $S_j$ of different hierarchical levels, in the present example for the nested submodels $S_0$, $S_1$, whereby the values $a_0$, $b_0$, ..., $a_1$, $b_1$, ..., etc., for the options A, B, ..., etc., are taken into account in the computer-aided generation of program code for each submodel $S_0$, $S_1$.

In the case that an option X (in the example according to FIG. 2, this relates to options B, C and F) of submodel $S_1$ at the lower hierarchical level is not provided with a value x, this option, in the present case B, C, and F, at the lower hierarchical level is set to the value x of the corresponding option of submodel $S_0$ at the higher hierarchical level; i.e., the corresponding options values of the higher hierarchical level are assumed in the lower hierarchical level. In the illustrated case, the values $b_0$, $c_0$ and $f_0$ for submodel $S_1$ are taken from submodel $S_0$ of the higher hierarchical level. By enabling the presetting of different options values for nested submodels at different hierarchical levels, it is possible to preset options granularly and thereby more suited to the situation for compiling the graphical model or submodels of the graphical model. A uniform behavior is achieved with the simultaneous clever realization of error avoidance by the measure that the values that have not been set for options in a lower hierarchical level are not set and values for them have been taken from the higher hierarchical level.

Figure 3:
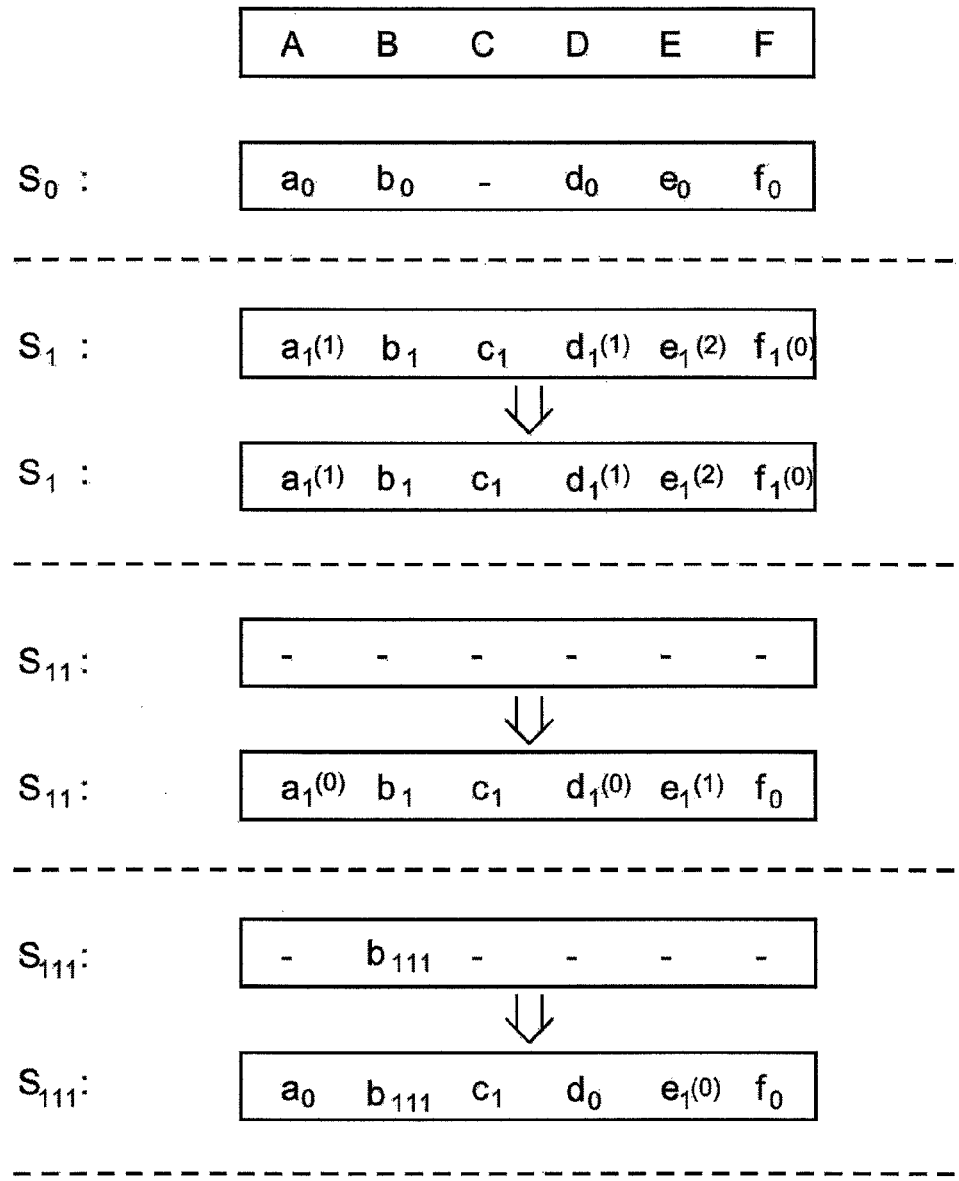
FIG. 3 shows another aspect of the method of the invention in regard to the range of presets.

FIG. 3 shows two refined behaviors of the previously described computer-aided automatically performed method for generating an executable control program. As in the preceding example, here as well the options A, . . . , F are available and can be associated with values a, . . . , f. In model $S_0$ at the highest hierarchical level, except for option C all other options A, B, D, E, F are associated with values $a_0$, $b_0$, $d_0$, $e_0$, $f_0$. Two rows are shown in each case for submodels $S_1$, $S_{11}$, $S_{111}$ of the next lower hierarchical levels. The top row indicates which values have been actively set for the submodel and for the individual options, and the lower row indicates how after use of the principles of the method of the invention, in each case indicated by the downward pointing arrow, the values have been modified if necessary.

Only the option B will be discussed here. The value $b_0$ has been set for option B for graphical model $S_0$ at the highest hierarchical level. For submodel $S_1$ at the next lower hierarchical level, the value $b_1$ has been set for option B. In the present case where different values $b_0$, $b_1$ have been set for nested submodels $S_0$, $S_1$, the preset value $b_1$ for option B is retained at the lower hierarchical level $S_1$ by the method realized here; the value $b_1$ at the lower hierarchical level $S_1$ therefore has precedence over the value $b_0$ for option B set in model $S_0$ at the higher hierarchical level. The same behavior can be observed in the case of submodel $S_{111}$ at the lowest hierarchical level. Here the value $b_{111}$ set for option B takes precedence over the value $b_1$ for option B for submodel $S_{11}$ at the next higher hierarchical level, so that the value $b_{111}$ is retained for submodel $S_{111}$. If no value had been preset for option B for submodel $S_{111}$, according to the method described by FIG. 2, the value $b_1$ applicable to submodel $S_{11}$ would also have to be assumed for submodel $S_{111}$.

A further special embodiment of the method for generating an executable control program 2 is evident from FIG. 3. According to the shown method variant, for a preset value (in the present case the values $a_1$, $d_1$, $e_1$, and $f_1$) for an option (in the present case for options A, D, E, and F) for a submodel, in the shown example for submodel $S_1$, at a hierarchical level the number of the lower hierarchical levels is specified in which the preset value for the respective option has precedence. In the shown exemplary embodiment, according to this number of lower hierarchical levels the value for the respective option again assumes the value of the higher hierarchical level. This behavior is explained initially by way of example by the value $a_1$, set in submodel $S_1$, for option A. For submodel $S_1$, not only the value $a_1$ has been set, but the value $a_1$ has been provided in addition with information on its range, i.e., with the indication in how many lower hierarchical levels the value is also entered in the nested submodels $S_{11}$, $S_{111}$. For submodel $S_1$, accordingly the value $a_1(1)$ has been set. According to the previously explained precedence of locally, therefore within a subsystem, set values for an option, this value $a_1(1)$ is not overlaid by the value $a_0$, set in submodel $S_0$ in higher hierarchical level, for option A, rather it remains retained in submodel $S_1$. According to the preset, the value $a_1$ precisely one lower hierarchical level wide should be passed on, therefore to submodel $S_{11}$. In submodel $S_{11}$, the value $a_1$ still has only the range 0, identified by the notation $a_1(0)$. Because the range is exhausted here, option A in submodel $S_{111}$ of the next lower hierarchical level again assumes the previous value $a_0$. The values $d_1$, $e_1$, and $f_1$, provided with a range in submodel $S_1$, exhibit a corresponding behavior.

Figure 4:
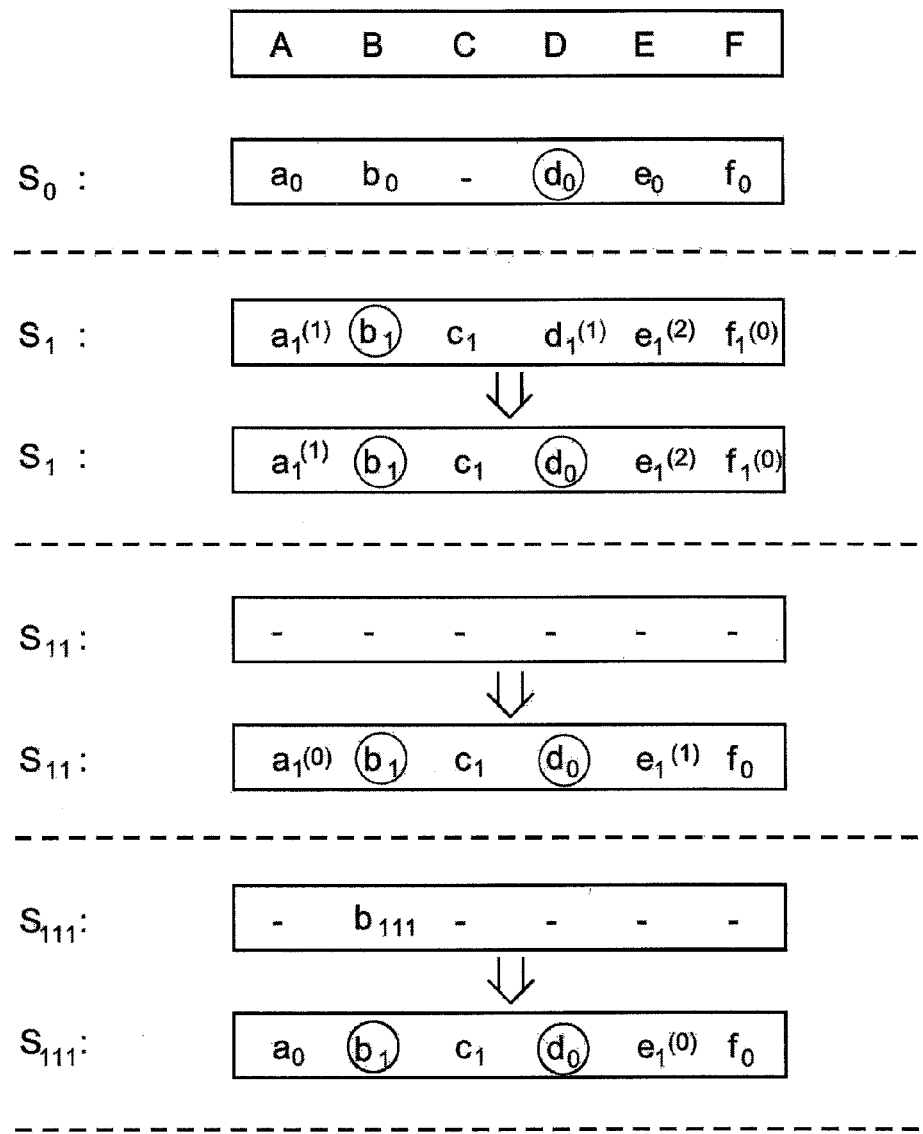
FIG. 4 shows the use of constant options in the method of the invention.

FIG. 4 shows the behavior of the computer-aided method, when a preset value for an option for a submodel at a hierarchical level (and thereby also a value for an option for the model at the highest hierarchical level) is designated as unchangeable, therefore is designated as a "constant option." In the exemplary embodiment shown in FIG. 4, unchangeable values for options are shown circled. At the topmost model level $S_0$, this is the value $d_0$ for option D; in submodel $S_1$ this is additionally the value $b_1$ for option B. After the values $b_1$ and $d_0$ have been designated as unchangeable, these values $b_1$, $d_0$ are also applied by nested subsystems $S_{11}$, $S_{111}$ at lower hierarchical levels and in fact also when at one of these lower hierarchical levels $S_{11}$, $S_{111}$ another value is set for the corresponding option B, D (see the value $d_1(1)$ in subsystem $S_1$ and the value $b_{111}$ in subsystem $S_{111}$).

Figure 5:
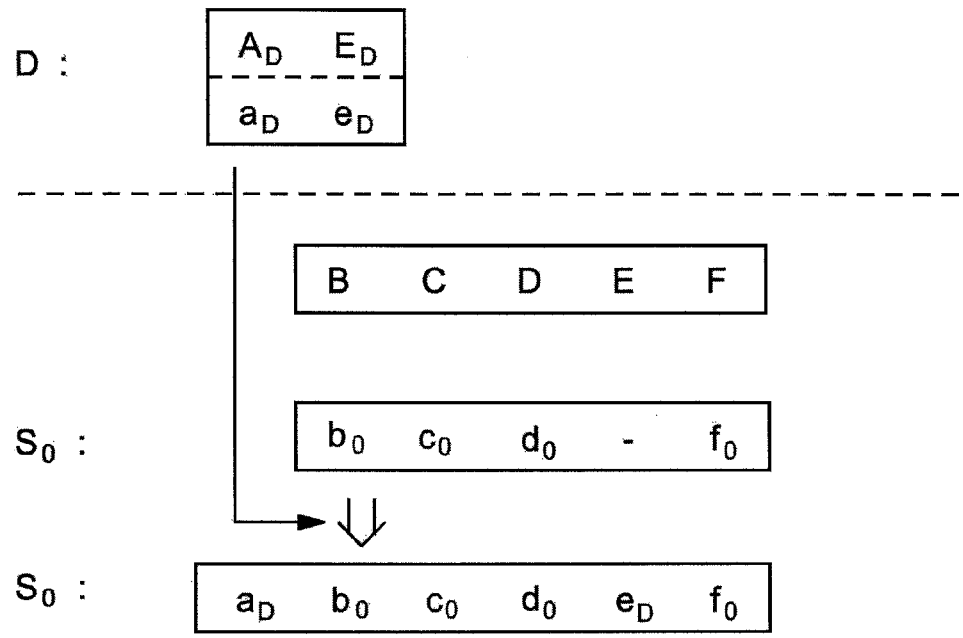
FIG. 5 shows the use of default options in the method of the invention.

In another embodiment of the method (FIG. 5), at least one default option $X_D$ for the compiling of the graphical model $S_0$ to program code is defined and a default value $x_D$ is preset for these default options $X_D$. In the present example, the default values $x_D$ are used for the default options $X_D$, so that they are used as a preset value for the corresponding option of model $S_0$ at the highest hierarchical level, if the value of the corresponding options in the graphical model is not defined. In the example according to FIG. 5, only the options B, C, D, E, F are known per se for model $S_0$, whereby only options B, C, D, and F at the highest hierarchical level in graphical model $S_0$ are assigned the values $b_0$, $c_0$, $d_0$, and $f_0$. The automated method, again designated by the downward pointing arrow, makes sure that in the case of unset values for options (this also affects option A still not known in the model), the default values are automatically set for these options. It is prevented in this way that local values need to be set, when these have been previously specified uniformly as the default value. Further, it can also be assured in this way that a compiling process is terminated, if values have failed to be assigned to certain options; the default values function as a fallback position here. In a preferred embodiment, default values for options can also be overwritten locally. If, for example, in the variant shown in FIG. 5 in addition option C were to have been defined as the default option $C_D$ with the default value $c_D$, the value $c_0$ set in graphical model $S_0$ for option C would overwrite this default value $c_0$.

Figure 6:
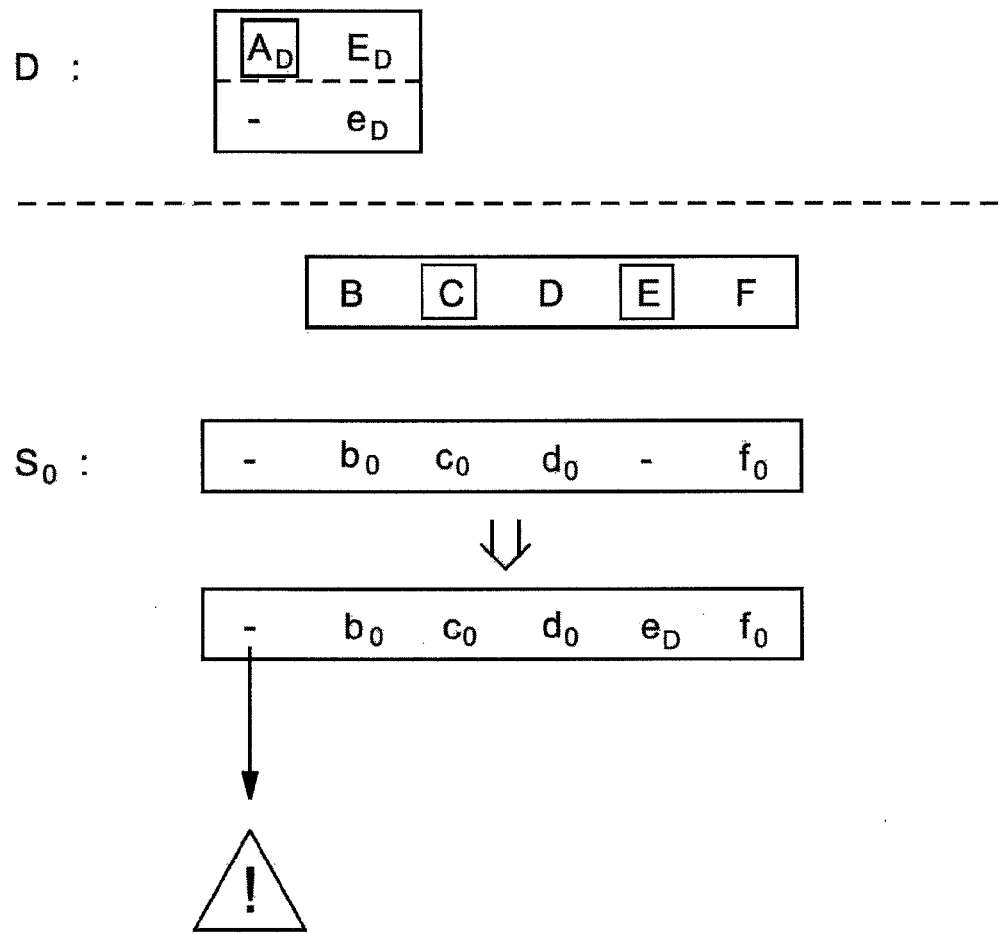
FIG. 6 shows the use of options that must be associated with values within the scope of the method of the invention.

FIG. 6 shows an embodiment of the method, in which it is possible to designate an option so that it must be assigned a value within the model or within a submodel or also as a default option. In FIG. 6, the default option $A_D$, option C, and option E are designated as options that must be assigned a value in each case by means of a square border. If the assignment of the thus designated options does not occur, an error message or warning is output, if the associated option at the time of the compiling of graphical model $S_0$ to program code has not been assigned a value in a lower lying hierarchical level. In the example shown in FIG. 6, option C, designated as to be assigned a value, at the highest hierarchical level in model $S_0$ is assigned the value $C_0$, so that the presetting of the necessary value assignment has been fulfilled. Option E designated as necessarily to be assigned a value is assigned the default value $e_D$ of default option $E_D$, so that in this case as well the presetting of the necessary value assignment is fulfilled. In the case of default option $A_D$ necessarily to be assigned a value, the specific presetting of a value a for the option $A_D$ has not occurred, so that a warning is output; in a variant that is not shown, the process is terminated in the same situation with an error.

Figure 7:
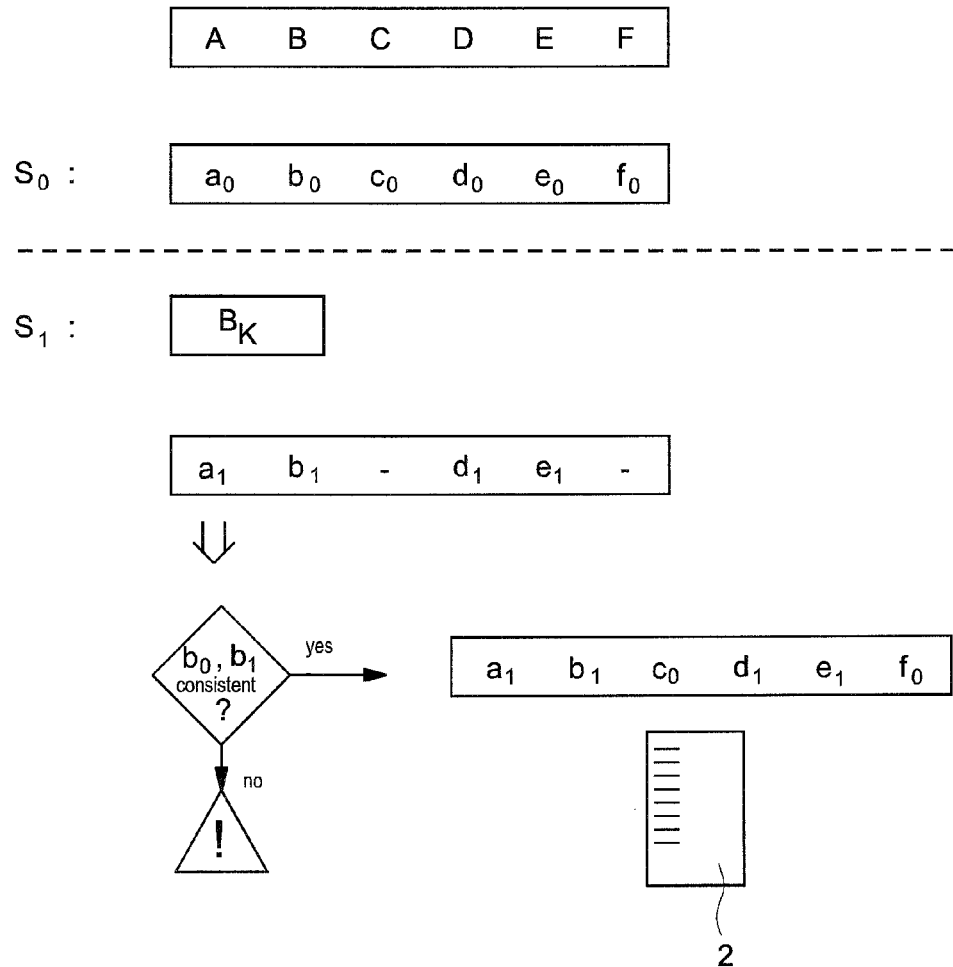
FIG. 7 shows the use of consistency options with the method of the invention.

The automated use of consistency options $X_K$ is explained in FIG. 7. The embodiment of the method shown in FIG. 7 makes it possible to designate a specific option X as the so-called consistency option $X_K$, which in the presented case in submodel $S_1$ refers to option B, which is labeled there as consistency option $B_K$. The labeling of an option as consistency option $X_K$ is useful when there is a high probability of unresolvable conflicts, if for different nested submodels inconsistent presettings, particularly different from their value, have been made for these options. An example of such an option is again the bit width for the target hardware, therefore for control system 3, in which control program 2 is to be run. The labeling of option B as a consistency option triggers a checking of the values for the consistency option in all hierarchical levels at the latest at the time of the compiling of graphical model $S_0$, whereby if an inconsistency is detected a warning message is output; or the process is terminated with an error message. If the consistency test is positive, the program code and control program 2 are generated.

Figure 8:
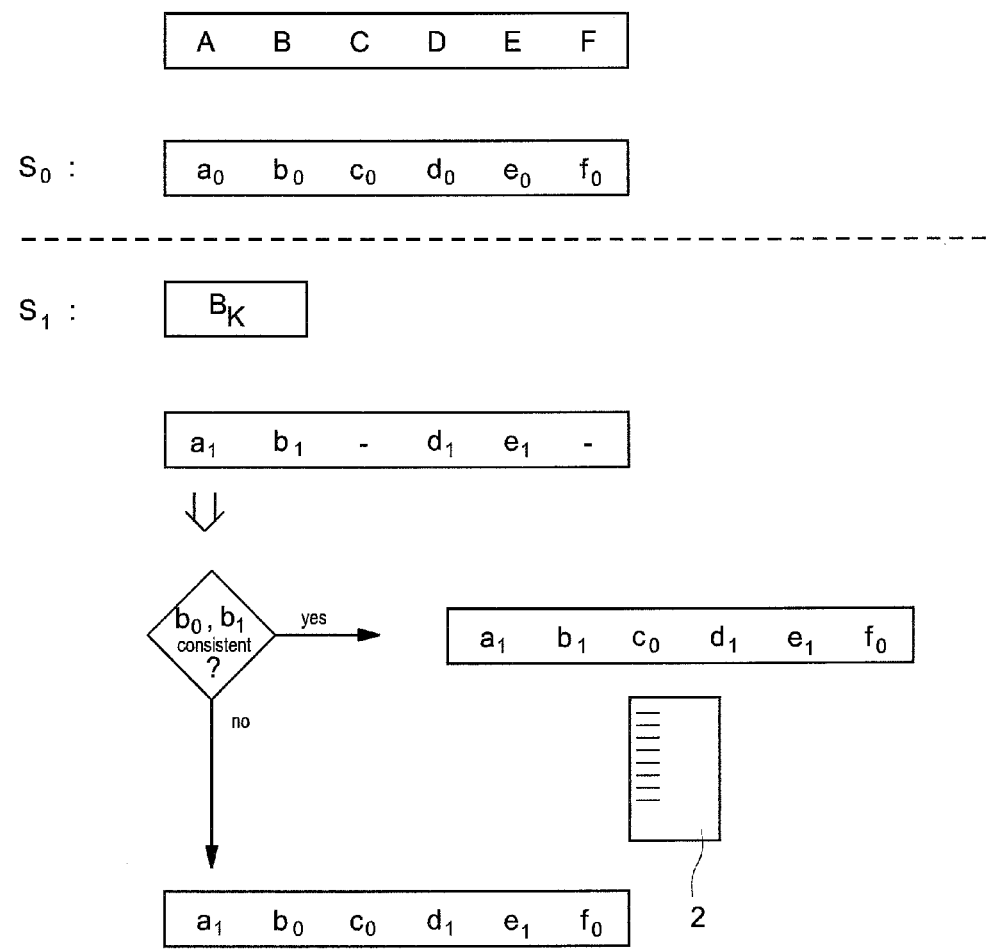
FIG. 8 shows another exemplary embodiment with respect to the use of consistency options within the scope of the method of the invention.

FIG. 8 shows a refinement of the method described by FIG. 7 in dealing with consistency options. The starting situation is the same as in FIG. 7; the difference is only in the behavior of the shown automatic method in the case that an inconsistency is detected. If the different values $b_0$ and $b_1$ for the consistency option $B_K$ are inconsistent, then according to FIG. 8 the method does not terminate the compiling process, but the value set in the highest hierarchical level, in the present case the value $b_0$, for consistency option $B_K$ is also applied in all submodels at lower hierarchical levels, so that consistency in terms of value uniformity is achieved and on this basis ultimately the control program is generated.

Figure 9:
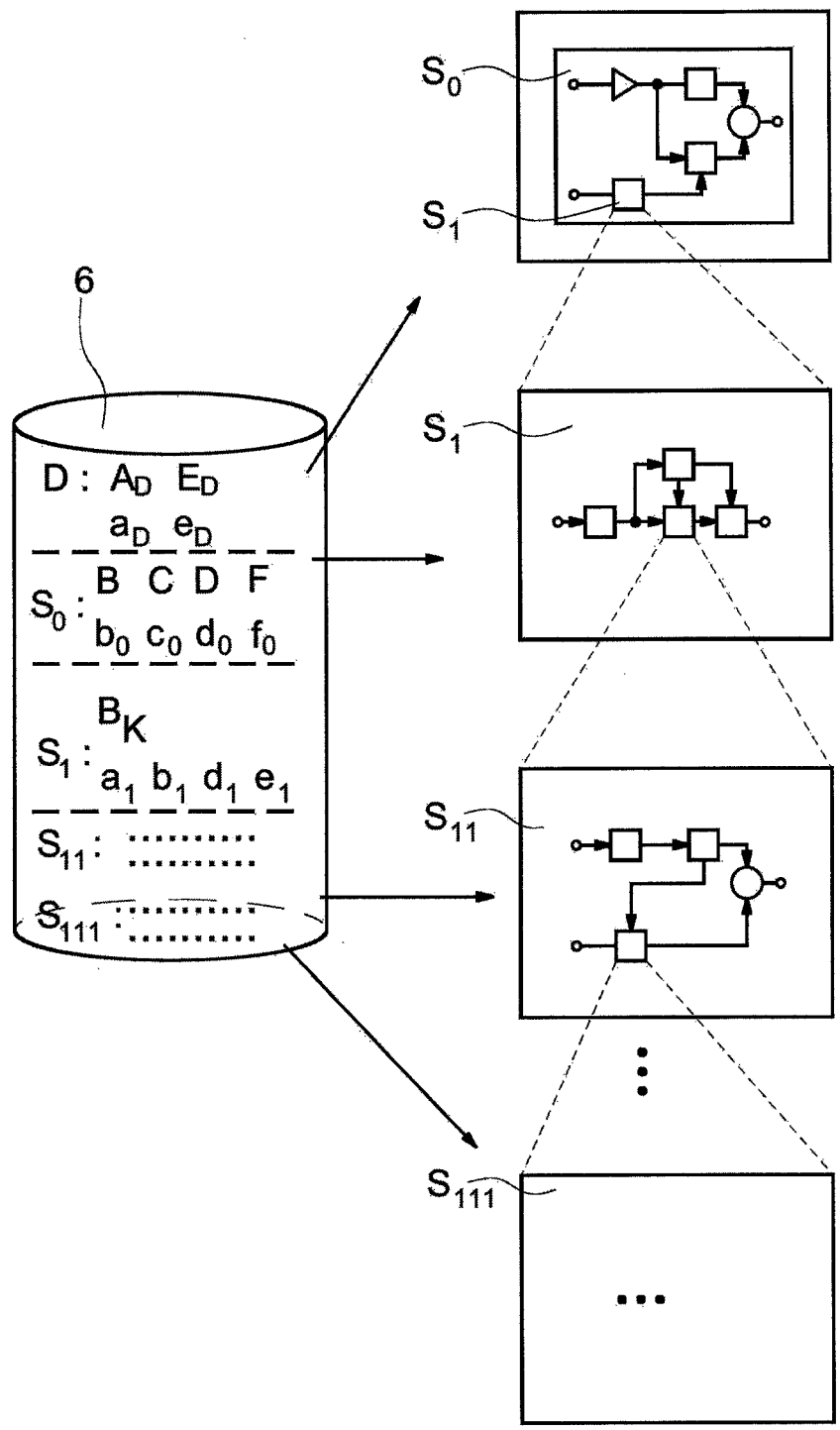
FIG. 9 shows an example of the storing of options and values of options for use with the method of the invention.

It is shown in FIG. 9 that the options A, . . . , F and the associated values a, . . . , f and also their classifications, for example, default, consistency, or constant options, are stored separately from the graphical model in a database 6, whereby in database 6 in addition references to the particular submodel $S_0$, $S_1$, $S_{11}$, $S_{111}$ are stored, so that the data are associated with the particular submodel $S_0$, $S_1$, $S_{11}$, $S_{111}$. The referencing is realized in database 6 by the naming of the particular submodel $S_0$, $S_1$, $S_{11}$, $S_{111}$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the computer-aided generation of at least one part of an executable control program for controlling a control system having at least one electronic processor unit, the method comprising:
describing a functionality of the control program at least partially in at least one graphical model;
dividing the graphical model into hierarchical levels in the form of submodels;
providing at least some preset values for options in the submodels; and
generating code with consideration of the preset values,
wherein when one of the options of a submodel at a lower hierarchical level is not provided with a value, the submodel at the lower hierarchical level assumes the value of the corresponding option of a submodel at a higher hierarchical level,
wherein for a preset value for an option for the submodel at the lower hierarchical level, a number of additional lower hierarchical levels following the submodel, to which the preset value is to be applied, is specified, such that the preset value for the respective option has precedence and is applied to the specified number of additional lower hierarchical levels, and
wherein at least one hierarchical level exists that is lower than or below the specified number of lower hierarchical levels and the at least one hierarchical level that is lower than or below the specified number of lower hierarchical levels is provided with a preset value for the respective option that corresponds to a preset value of the respective option provided in a hierarchical level that is higher than the hierarchical level of the submodel.

2. A method for the computer-aided generation of at least one part of an executable control program for controlling a control system having at least one electronic processor unit, the method comprising:
describing a functionality of the control program at least partially in at least one graphical model having a highest hierarchical level;
dividing the graphical model in hierarchical levels into submodels, a submodel of a hierarchical level being configured to be divided into nested submodels of a lower hierarchical level;
providing preset values (x) for options (X) for the compiling of the graphical model to program code;
generating program code computer-aided with consideration of the values (x) of the options (X) from the model; and
co-compiling the program code to the executable control program,
wherein a value $(x_j)$ for an option (X) for the compiling of the graphical model for at least two nested submodels of different hierarchical levels are preset, and the values $(x_j)$ for the options (X) are taken into account in the computer-aided generation of program code for each submodel, and
wherein an option (X) of the submodel, said option not provided with a value $(x_j)$, at the lower hierarchical level assumes the value $(x_j)$ of the corresponding option (X) of the submodel at the higher hierarchical level,
wherein for a preset value $(x_j)$ for an option (X) for a submodel at a hierarchical level, a number of lower hierarchical levels following the submodel, to which the preset value $(x_j)$ is to be applied, is specified, such that the preset value $(x_j)$ for the respective option (X) has precedence and is applied to the specified number of lower hierarchical levels, and
wherein at least one hierarchical level exists that is lower than or below the specified number of lower hierarchical levels and the at least one hierarchical level that is lower than or below the specified number of lower hierarchical levels is provided with a preset value for the respective option that corresponds to a preset value of the respective option provided in a hierarchical level that is higher than the hierarchical level of the submodel.

3. The method according to claim 2, wherein a preset value $(x_j)$ for an option (X) at the lower hierarchical level has precedence over the preset value $(x_j)$ for the corresponding option (X) at the higher hierarchical level.

4. The method according to claim 2, wherein when a preset value $(x_j)$ for an option (X) for a submodel at a hierarchical level and/or for an option for the graphical model is designated as unchangeable, the value ($x_j$) for this option (X) at a lower hierarchical level can no longer be changed, even when another value ($x_j$) is or has been established for the corresponding option (X) at a lower hierarchical level.

5. The method according to claim 2, wherein a default option ($X_D$) for the compiling of the graphical model to program code is defined and a default value ($x_D$) is preset, which is used as a preset value for the corresponding option (X) of the graphical model, if a value of the corresponding option (X) is not defined in the graphical model.

6. The method according to claim 2, wherein at least one option (X) for a submodel at a hierarchical level and/or at least one option (X) for the graphical model and/or at least one default option ($X_j$) are labeled as an option (X) to be provided with a value at a lower hierarchical level, and wherein an error message/warning is output, when the associated option (X) at the time of the compiling of the graphical model to program code has not been assigned a value (x) at a lower hierarchical level.

7. The method according to claim 2, wherein at least one option (X) for a submodel at a hierarchical level and/or at least one option (X) for the graphical model and/or at least one default option are labeled as a consistency option ($X_K$), wherein at the latest at a time of compiling of the graphical model to program code it is verified whether the value (x) for the consistency option ($X_K$) is set consistently in all hierarchical levels of the respective nested submodel, and wherein, if an inconsistency is detected, at least one message, an error, or warning message is output.

8. The method according to claim 7, wherein if an inconsistency is detected, the compiling of the graphical model to program code is terminated or wherein the inconsistency-containing model or submodel is compiled to invalidated program code.

9. The method according to claim 7, wherein, if a consistency option ($X_K$) assigned inconsistent values is detected, the value (x) preset at the highest hierarchical level for the consistency option ($X_K$) is also automatically preset as the preset value (x) for the nested submodels at the lower hierarchical level.

10. The method according to claim 2, wherein the name and value (x) of at least one option (X) are documented in addition with the information on the source of the value (x) of this option (X) as options information, in particular the options information is generated in the corresponding part of the program code, wherein the options information is specified as source information whether the option (X) and/or the value of the option have been preset locally in the respective submodel or whether the option (X) and/or the value (x) of the option (X) in the respective submodel have been assumed from a submodel of a higher hierarchical level or whether the option (X) and/or the value (x) of the option (X) in the respective submodel have been set by a default preset.

11. The method according to claim 10, wherein the documented options information is generated separately from the compiling of the graphical model to program code, and wherein the generated documented options information is checked for an error and wherein consistency options ($X_K$) are checked for consistency.

12. The method according to claim 10, wherein the options information is generated in the program code, wherein the options information is evaluated by additional compiler instructions during the compiling of the program code to the executable control program by the compiler and thereby the options are checked with respect to the consistency of the preset value (x) in the case of a consistency option ($X_K$).

13. The method according to one claim 2, wherein at least one option (X), its value (x), and optionally its classification are stored together with the graphical model in at least one model file, or wherein at least one option (X), its value (x), and optionally its classification are stored in a separate database and associated there with the particular submodel.

14. The method according to claim 2, wherein at least one option influences directives for the memory layout in the generated program code and/or the memory layout of the control program with consideration of the memory regions and/or the processor unit of the control system.

15. The method according to claim 2, wherein at least one option (X) adapts the generated program code to the processor unit of the control system or to the bit width thereof.

16. The method according to claim 2, wherein the at least one part of an executable control program is a measuring, control, regulating, and/or calibration program.

17. The method according to claim 2, wherein the graphical model is a block diagram of an algorithm of the control program.

18. The method according to claim 2, wherein the options (X) are settings for the generation of the program code.

* * * * *